United States Patent
Arumugam et al.

(10) Patent No.: US 12,505,378 B2
(45) Date of Patent: Dec. 23, 2025

(54) INCREMENTAL TRAINING FOR REDUCING PERFORMANCE DEGRADATION IN MACHINE LEARNING MODELS

(71) Applicant: SAP SE, Walldorf (DE)

(72) Inventors: Rajesh Vellore Arumugam, Singapore (SG); Andrew Ivan Soegeng, Singapore (SG); Stefan Klaus Baur, Heidelberg (DE)

(73) Assignee: SAP SE, Walldorf (DE)

( * ) Notice: Subject to any disclaimer, the term of this patent is extended or adjusted under 35 U.S.C. 154(b) by 1093 days.

(21) Appl. No.: 17/452,441

(22) Filed: Oct. 27, 2021

(65) Prior Publication Data

US 2023/0128485 A1    Apr. 27, 2023

(51) Int. Cl.
*G06N 20/00* (2019.01)
(52) U.S. Cl.
CPC .................... *G06N 20/00* (2019.01)
(58) Field of Classification Search
CPC ................. G06N 20/00; G06N 3/082
See application file for complete search history.

(56) References Cited

U.S. PATENT DOCUMENTS

| | | | |
|---|---|---|---|
| 2019/0087574 A1* | 3/2019 | Schmidtler | G06F 21/567 |
| 2020/0193511 A1 | 6/2020 | Saito et al. | |
| 2020/0202171 A1* | 6/2020 | Hughes | G06F 8/36 |
| 2021/0042580 A1* | 2/2021 | Chen | G06N 3/08 |
| 2021/0150201 A1* | 5/2021 | Reisswig | G06V 30/414 |

OTHER PUBLICATIONS

Pagels, Introducing One of the Best Hacks in Machine Learning: the Hashing Trick, Dec. 30, 2017, The Hands-on Advisors, 14 pages, https://medium.com/value-stream-design/introducing-one-of-the-best-hacks-in-machine-learning-the-hashing-trick-bf6a9c8af18f (Year: 2017).*

Wikipedia.org [online], "Feature Hashing" created on Feb. 2014, [retrieved on Oct. 19, 2021], retrieved from : URL <https://en.wikipedia.org/wiki/Feature_hashing>, 5 pages.

* cited by examiner

*Primary Examiner* — Michael J Huntley
(74) *Attorney, Agent, or Firm* — Fish & Richardson P.C.

(57) ABSTRACT

Methods, systems, and computer-readable storage media directed to incremental training of ML models using incremental data to reduce degradation of performance of the ML models over time. Implementations of the present disclosure reduce overhead, in terms of time and technical resources, expended to retrain ML models using full sets of training data. Further, through incremental training, implementations of the present disclosure evaluate multiple data sets to achieve ML model performance that meets or exceeds performance achieved through training on the entire data sets, while providing reduced training times.

17 Claims, 6 Drawing Sheets

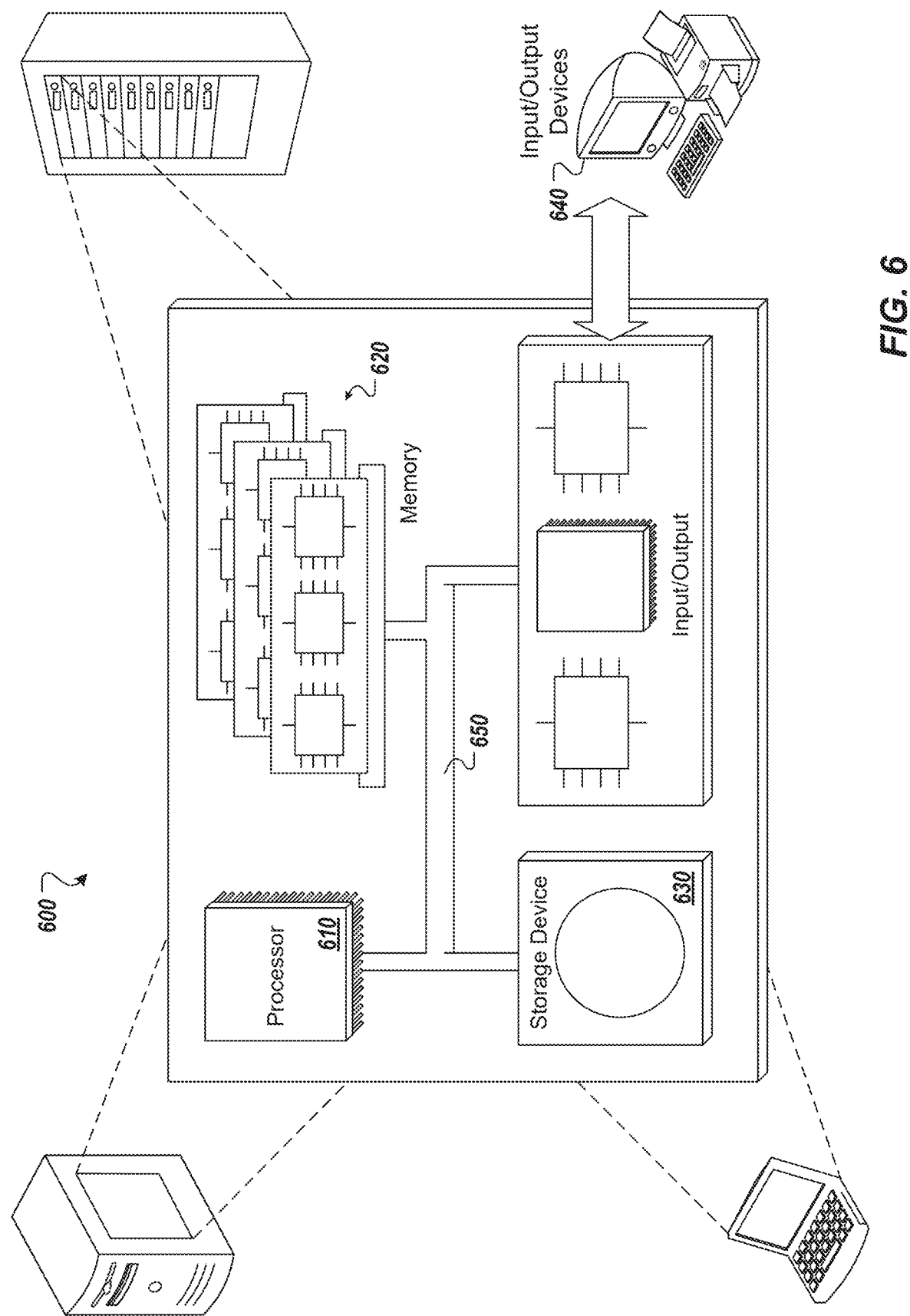

INCREMENTAL TRAINING FOR REDUCING PERFORMANCE DEGRADATION IN MACHINE LEARNING MODELS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform a task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

However, ML models undergo performance degradation in production systems. For example, the performance of a ML model can degrade over time as a result of data drift, which can be described as the gap between training data and inference data. Training data is data that is used to train the ML model during a training phase and inference data is data submitted to the ML model for predictions during an inference phase. Over longer periods of time the data drift grows and the ML model makes an increasing number of errors in the predictions.

A traditional approach to address this issue is to periodically retrain the ML model with updated training data that includes the original training data and new training data. However, this approach incurs a high overhead in terms of time and technical resources expended. For example, technical resources (e.g., processors, memory) are expended to perform data extraction, training time, configuration, and deployment/activation to production.

SUMMARY

Implementations of the present disclosure are directed to incremental training of machine learning (ML) models. More particularly, implementations of the present disclosure are directed to incremental training of ML models using incremental data to reduce degradation of performance of the ML models over time. Implementations of the present disclosure reduce overhead, in terms of time and technical resources, expended to retrain M L models using full sets of training data. Further, through incremental training, implementations of the present disclosure evaluate multiple data sets to achieve ML model performance that meets or exceeds performance achieved through training on the entire data sets, while providing reduced training times.

In some implementations, actions include receiving inference results with feedback (IRF) data sets, the IRF data sets including a set of records including inference results determined by the ML model during production use of the ML model and at least one correction to an inference result, executing incremental training of the ML model to provide an updated ML model at least partially by selectively filtering one or more records of the set of records to adjust a negative sample to positive sample proportion of a sub-set of records based on a negative sample to positive sample proportion of training data during initial training of the ML model, for each record in the sub-set of records, determining a weight, and during incremental training, applying the weight of a respective record being in a loss function in determining an accuracy of the ML model based on the respective record, and deploying the updated ML model for production use. Other implementations of this aspect include corresponding systems, apparatus, and computer programs, configured to perform the actions of the methods, encoded on computer storage devices.

These and other implementations can each optionally include one or more of the following features: the ML model is a classifier that classifies entity pairs to a class in a set of classes; a first weight for a first record is set equal to 1 in response to determining that a probability is less than a threshold probability; a first weight for a first record is set to a value greater than 1 in response to determining that a probability is greater than a threshold probability; a first weight of a first record is set equal to 1 in response to determining that the first record is designated to a specified class; executing incremental training of the ML model further includes, for each record in the sub-set of records, generating hash values for data including one or more of a categorical type and a string type, the ML model being incrementally trained based on the hash values; and incremental training is absent training data used to initially train the ML model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 6 is a schematic illustration of example computer systems that can be used to execute implementations of the present disclosure.

Like reference symbols in the various drawings indicate like elements.

DETAILED DESCRIPTION

Figure 1:
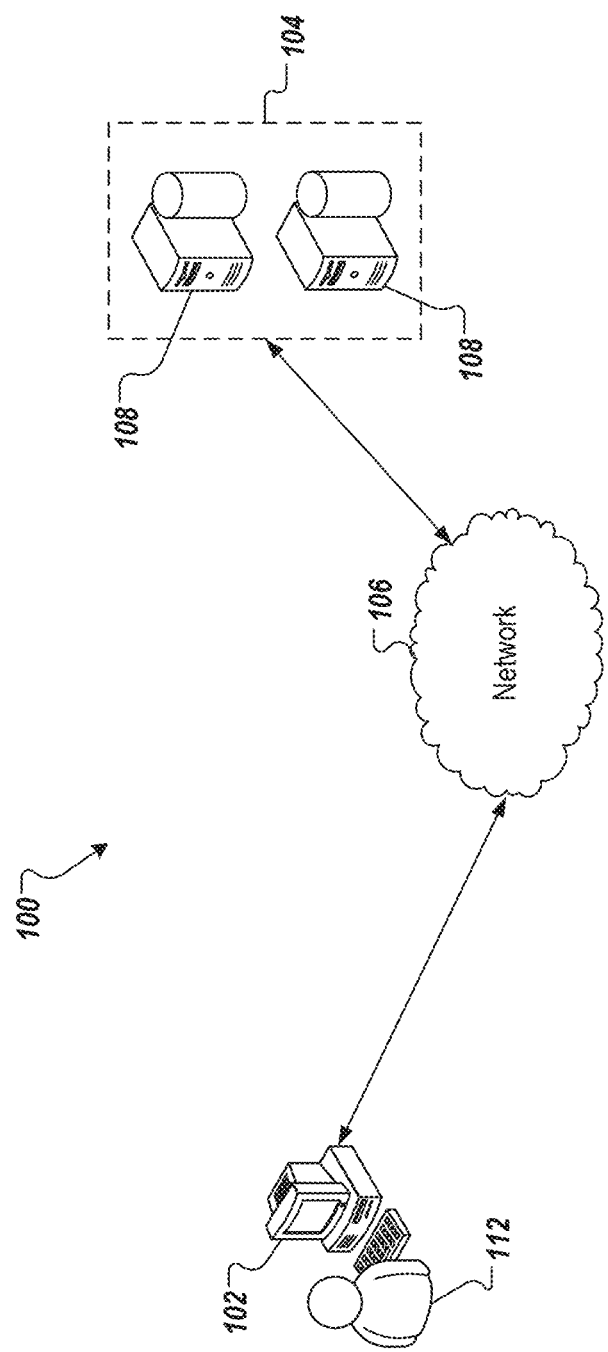
FIG. 1 depicts an example architecture that can be used to execute implementations of the present disclosure.

Implementations of the present disclosure are directed to incremental training of machine learning (ML) models. More particularly, implementations of the present disclosure are directed to incremental training ML models using incremental data to reduce degradation of performance of the MIL models over time. In some examples, the incremental data includes feedback on previous predictions of the ML models. Implementations of the present disclosure reduce overhead, in terms of time and technical resources, expended to retrain ML models using full sets of training data. Further, through incremental training, implementations of the present disclosure evaluate multiple data sets to achieve ML model performance that meets or exceeds performance achieved through training on the entire data sets, while providing reduced training times.

Implementations can include actions of receiving inference results with feedback (IRF) data sets, the IRF data sets including a set of records including inference results determined by the ML model during production use of the ML model and at least one correction to an inference result, executing incremental training of the ML model to provide an updated ML model at least partially by selectively filtering one or more records of the set of records to adjust a negative sample to positive sample proportion of a sub-set of records based on a negative sample to positive sample proportion of training data during initial training of the ML model, for each record in the sub-set of records, determining a weight, and during incremental training, applying the weight of a respective record being in a loss function in determining an accuracy of the ML model based on the respective record, and deploying the updated ML model for production use.

Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of one or more bank statements), enabling an autonomous system to determine one or more invoices that are represented in the bank statement using a ML model. It is contemplated, however, that implementations of the present disclosure can be realized in any appropriate problem space.

Implementations of the present disclosure are also described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP Leonardo Machine Learning) to learn accounting activities and to capture richer detail of customer and country-specific behavior. An example accounting activity can include matching payments to invoices for clearing of the invoices. For example, using an enterprise platform (e.g., SAP S/4 IANA), incoming payment information (e.g., recorded in bank statements) and open invoice information are passed to a matching engine, and, during inference, one or more ML models predict matches between bank statements and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

To provide further context for implementations of the present disclosure, and as introduced above, ML, models undergo performance degradation in production systems. For example, the performance of a ML model can degrade over time as a result of data drift, which can be described as the gap between training data and inference data. Training data is data that is used to train the ML model during a training phase and inference data is data submitted to the ML model for predictions during an inference phase. Over longer periods of time the data drift grows and the MIL model makes an increasing number of errors in the predictions.

A traditional approach to address this issue is to periodically retrain the ML model with updated training data that includes the original training data and new training data. However, this approach incurs a high overhead in terms of time and technical resources expended. For example, technical resources are expended to perform data extraction, training time, configuration, and deployment/activation to production. In further detail, traditional approaches provide for periodic updating of ML models (e.g., every 6 months or more) and includes completely retraining the ML models from scratch on an entire data set (e.g., the original training data and the data over the last period combined). The volume of this data is typically very large, which results in long training times and consumption of technical resources (e.g., processors, memory) before the ML model can be deployed to production. Moreover, increasingly incorrect predictions can be provided during the typically long intervals (e.g., 6 months) between last training and the next subsequent training where only then the ML model is updated on new data.

In view of the above context, implementations of the present disclosure are directed to incremental training of ML models using incremental data to reduce degradation of performance of the ML models over time. The reduced performance degradation is achieved by having shorter incremental retraining cycles (e.g., every 2 weeks) which keeps the ML model always trained or updated on the latest patterns in the data. In some examples, the incremental data includes feedback on previous predictions of the ML models. As described in further detail herein, implementations of the present disclosure address data drift in the domain of entity matching. Implementations of the present disclosure reduce overhead, in terms of time and technical resources, that would otherwise be expended to retrain ML models using full sets of training data. Further, through incremental training, implementations of the present disclosure evaluate multiple data sets to achieve ML model performance that meets or exceeds performance achieved through training on the entire data sets, while providing reduced training times and reduced consumption of resources.

FIG. 1 depicts an example architecture 100 in accordance with implementations of the present disclosure. In the depicted example, the example architecture 100 includes a client device 102, a network 106, and a server system 104.

The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statements), and can match electronic documents (e.g., a bank statement) to one or more entities (e.g., invoices). In some examples, the server system 104 includes a ML platform that provides and trains a ML model, as described herein.

Figure 2:
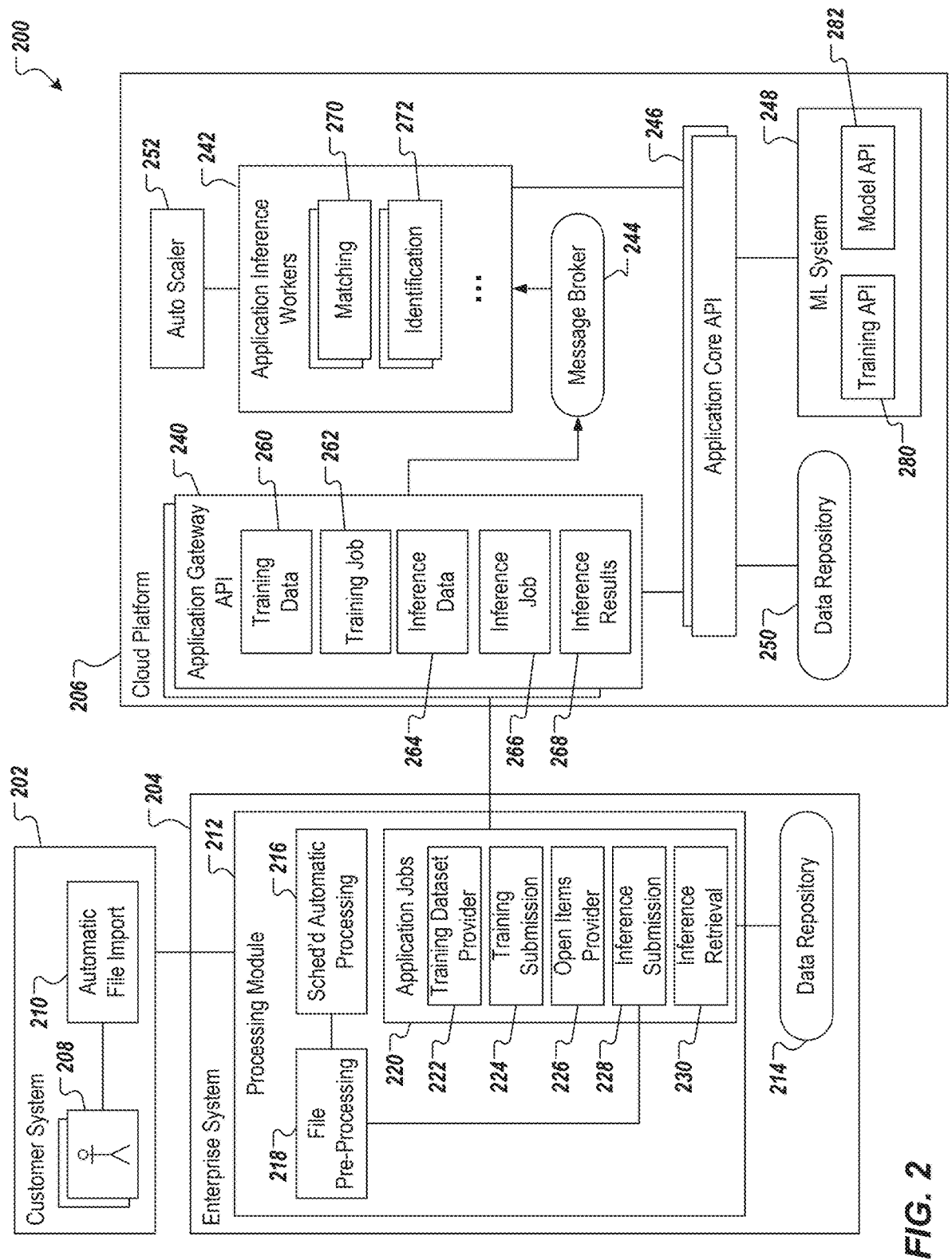
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 I-ANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. In the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP Leonardo Machine Learning. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

As introduced above, implementations of the present disclosure are directed to automatically training ML models using incremental data to reduce degradation of performance of the ML models over time to address data drift in the domain of entity matching. Entity matching can be described as the problem of matching items from one electronic document (e.g., a table) to a single item or a set of items in another electronic document (e.g., table) based on some inherent relationships. In the example problem space, entity matching includes matching bank statement payments to corresponding invoices.

In accordance with implementations of the present disclosure, the ML model is a classifier that is trained to predict entity pairs to a fixed set of classes. For example, the set of classes can include 'no match', 'single match', and 'multi match'. In some examples, the ML model is provided as a function $f$ that maps a query entity $Q_D$ and a target entity $T_D$ into a vector of probabilities (also called 'confidences' in the deep learning context) for the classes in the set of classes. This can be represented as:

$$f(Q_D, T_D) = \begin{pmatrix} p_0 \\ p_1 \\ p_2 \end{pmatrix}$$

where $p_0$ is a prediction probability of the entity pair $Q_D$, $T_D$ belonging to a first class (e.g., no match), $p_1$ is a prediction probability of the entity pair $Q_D$, $T_D$ belonging to a second class (e.g., single match), and $p_2$ is a prediction probability of the entity pair $Q_D$, $T_D$ belonging to a third class (e.g., multi match). Because the ML model is limited to the set of classes, additional classes will not be present in future data.

Here, $p_0$, $p_1$, and $p_2$ can be provided as numerical values indicating a likelihood that the entity pair $Q_D$, $T_D$ belongs to a respective class. In some examples, the ML model can assign a class to the entity pair $Q_D$, $T_D$ based on the values of $p_0$, $p_1$, and $p_2$. In some examples, the ML model can assign the class corresponding to the highest value of $p_0$, $p_1$, and $p_2$. For example, for an entity pair $Q_D$, $T_D$, the ML model can provide that $p_0=0.13$, $p_1=0.98$, and $p_2=0.07$. Consequently, the ML model can assign the class 'single match' to the entity pair $Q_D$, $T_D$.

In some implementations, the ML model is initially trained using training data (e.g., historical data seen in production system(s)). Example training data can include a set of entity pairs and, for each entity pair, a class assigned to the entity pair. For example, an example portion of training data can include:

TABLE 1

Portion of Example Training Data

| $Q_D$ | $T_D$ | Class |
| --- | --- | --- |
| 1 | 20 | Single |
| 2 | 25 | Multi |
| 2 | 1 | Multi |
| 3 | 8 | No Match |
| ... | ... | ... |

In the example of Table 1, query entities ($Q_D$) and target entities ($T_D$) are indicated using respective keys. However, the underlying computer-readable files record data describing the respective entities. For example, and in the example context of matching banks statements to invoices, a query entity ($Q_D$) entity can include a bank statement that is identified in the training data by key. However, the underlying computer-readable file can include data descriptive of the bank statement (e.g., monetary values, currency, memo lines, dates, payor name, payee name). In the example context of matching banks statements to invoices, a target entity ($T_D$) entity can include an invoice that is identified in the training data by key. However, the underlying computer-readable file can include data descriptive of the invoice (e.g., monetary values, currency, description, date, payor name, payee name). In some examples, the data includes one or more of categorical data, numerical data, and string data.

In general, the ML model is iteratively trained, where, during an iteration, one or more parameters of the ML model are adjusted, and an output is generated based on the training data (e.g., class predictions). For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

After initial training, the ML model can be used in a production environment to provide inference results. For example, an enterprise can submit inference jobs (e.g., inference job 266 of FIG. 2), which includes sets of entities that are to be matched using the ML model. For example, an example portion of an inference data, provided with an inference job, can include:

TABLE 2

Portion of Example
Inference Data

| $Q_D$ | $T_D$ |
|---|---|
| 5 | 10 |
| 6 | 15 |
| 6 | 11 |
| ... | ... |

The ML model can process the inference jobs to provide inference results (e.g., the inference results 268 of FIG. 2). In accordance with implementations of the present disclosure, the inference results can include, for each entity pair $Q_D$, $T_D$, a class predicted for the entity pair. For example, an example portion of inference results, provided with the inference job including the inference data of Table 2, can include:

TABLE 3

Portion of Example
Inference Data

| $Q_D$ | $T_D$ | Class |
|---|---|---|
| 5 | 10 | Single |
| 6 | 15 | Multi |
| 6 | 11 | Multi |
| ... | ... | ... |

As noted above, over time, the performance of the ML model can degrade (e.g., as a result of data drift). That is, for example, an inference result generated by the ML model can be incorrect. Such inaccuracies can be discovered by the enterprise that submitted the inference job and can be indicated in feedback data. For example, users (e.g., employees of the enterprise) can intermittently provide an inference result with feedback (IRF) data set that indicates inference results of the ML model that were correct and inference results of the ML model that were incorrect, in hand with correction(s). For example, and considering the examples of Tables 2 and 3 above, an example portion of an IRF data set can include:

TABLE 4

Portion of Example Inference Data

| $Q_D$ | $T_D$ | Class | Correct |
|---|---|---|---|
| 5 | 10 | Single | Y |
| 6 | 15 | Multi | 13 |
| 6 | 11 | Multi | Y |
| ... | ... | ... | ... |

In the example of Table 4, the predicted class for the entity set 6, 15 is incorrect, and instead, the entity 6 should have been matched with the entity 13, the other predictions being indicated as accurate (e.g., yes (Y)).

In accordance with implementations of the present disclosure, the ML model is incrementally trained (re-trained) using the IRF data sets. For example, the ML model is trained in response to receiving an IRF data set. The ML model is trained using the IR data set absent the original training data. That is, only the IRF data set is used during incremental training. In this manner, and as described in further detail herein, the ML model is more frequently and resource-efficiently updated as compared to traditional approaches, because less and more focused data is being used to incrementally train the ML model.

Figure 3:
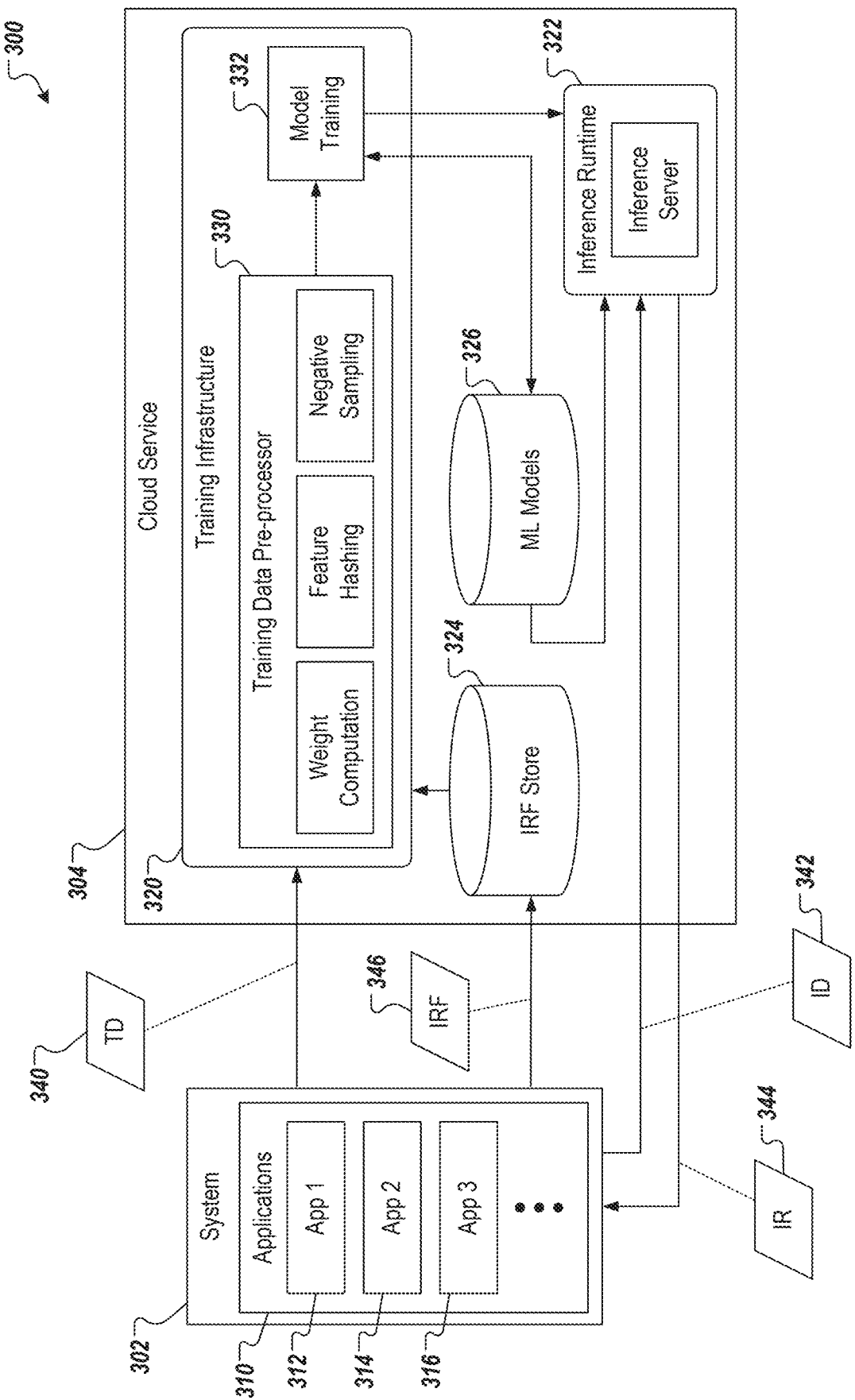
FIG. 3 depicts an example conceptual architecture in accordance with implementations of the present disclosure.

FIG. 3 depicts an example conceptual architecture 300 in accordance with implementations of the present disclosure. The example of FIG. 3 depicts incremental training in accordance with implementations of the present disclosure. In the example of FIG. 3, the conceptual architecture 300 includes an enterprise system 302 (e.g., SAP S/4 HANA (either cloud or on premise)) and a cloud service 304. The enterprise system 302 executes a set of applications 310 including applications 312, 314, 316. In some examples, one or more of the applications 312, 314, 316 submit inference jobs to the cloud service 304 to receive inference results therefrom. The cloud service 304 includes a training infrastructure 320, an inference runtime 322, an IRF store 324, and a ML models store 326. The training infrastructure 320 includes a training data pre-processor 330 and a model training module 332. The training data pre-processor 330 includes a weight computation sub-module, a feature hashing sub-module, and a negative sampling sub-module. In some examples, the enterprise system 302 corresponds to the enterprise system 204 of FIG. 2 and the cloud service 304 corresponds to the cloud platform 206 of FIG. 2.

In accordance with implementations of the present disclosure, an application 312, 314, 316 initially sends training data ($T_D$) 340 to the cloud service 304 (e.g., as training data 260 for the training job 262 of FIG. 2). In some examples, the $T_D$ 340 includes historical entity pairs (i.e., query (Q) and target (T) pairs) and, for each entity pair, a ground truth that indicates which class the respective entity pair belongs to (e.g., single match, multi-match). For example, the $T_D$ 340 can include that of Table 1 provided above. A training job is triggered (e.g., as training data 260 for the training job 262 of FIG. 2) to provide initial training of the ML model. In some examples, feature hashes are created by the feature hashing sub-module of the training data pre-processor 330, as described in further detail herein. The ML model is trained by the model training module 332 using the feature hashes. For example, the model training module 332 executes an iterative training process based on a loss function, as described in further detail herein. After training, the ML model is stored in the ML models store 326 and is made available for inference (e.g., production use).

In some examples, the ML model is deployed to the inference runtime 322, which executes inferences in response to inference jobs (e.g., the inference job 266 of FIG. 2). For example, the application 312, 314, 316 (for which the ML model was trained), sends an inference request that includes inference data (ID) 342. In some examples, the ID 342 includes entity pairs that are to be classified by the ML model. For example, the ID 342 can include that of Table 2 provided above. Inference results (IR) 344 are generated by the ML model, which include class predictions for each entity pair in the ID 342. For example, the IR 344 can include that of Table 3 provided above.

The enterprise, on behalf of which the application 312, 314, 316 is executed, can review the IR 344 and make any corrections that might be required. For example, and as discussed above with respect to the examples of Tables 2 and 3, it can be determined that, while the classes predicted for the entity pairs <5, 10> and <6, 11> are correct, the class for the entity pair <6, 15> is incorrect. Based on further investigation and domain knowledge, for example, the enterprise can correct this in the enterprise system 302 to match the query 6 to the target 13, as represented in Table 4 above. In some examples, the application 312, 314, 316 provides IRF 346 to the cloud service 304, which represents correct predictions and incorrect prediction, and, for each incorrect prediction, a correction. The IRF 346 is persisted in the IRF store 324.

In some examples, the cloud service 304 automatically performs incremental training of the ML model to provide an updated ML model based on accumulated IRF 346. In some examples, incremental training is initiated in response to receipt of IRF 346 from the enterprise system 302. In some examples, incremental training is initiated in response to a predetermined period of time expiring since the last training (e.g., incremental training is performed at predetermined intervals). In some examples, incremental training is initiated after a threshold amount of IRF 346 is received (e.g., X records being received).

During incremental training, and as described in further detail herein, weights are computed by the weight computation sub-module for each record (e.g., entity pair and respective class). Further, the negative sampling sub-module computes a number of negative samples required based on the initial training sampling ratio and the current data size, as also described in further detail herein. The feature hashing sub-module determines feature hashes for the records of the IRF 346. The original ML model is copied to the model training module 332 from the ML models store 326, and the model training module 332 trains the ML model using the weights, feature hashes, and negative samples determined from the IR 346 to provide an updated ML model. The updated ML model is saved in the ML models store 326 and can be deployed to the inference runtime 322. The updated ML model is used to make predictions for subsequent inference requests. This process can repeat to continuously adapt the ML model to the new data (i.e., the incoming IRF 346) and reduce a number of prediction errors that would otherwise occur over time.

Figure 4:
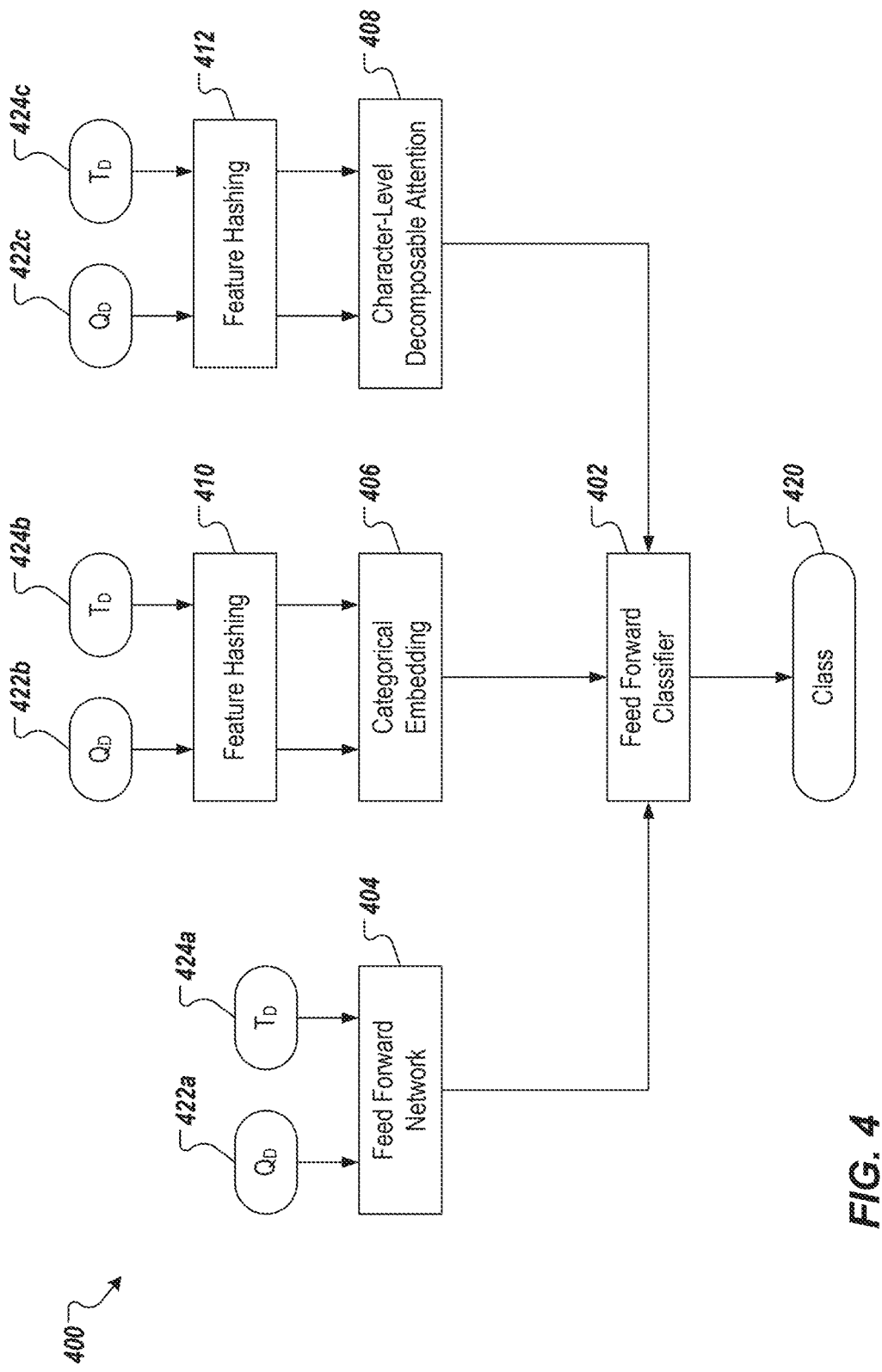
FIG. 4 depicts a conceptual representation of incremental training in accordance with implementations of the present disclosure.

FIG. 4 depicts a conceptual representation 400 of incremental training in accordance with implementations of the present disclosure. In the example of FIG. 4, the conceptual representation 400 includes an ML model 402 (e.g., provided as a feed forward classifier) that is to be trained, a feed forward network 404, a categorical embedding module 406, a character embedding module 408 (e.g., that uses a character-level decomposable attention mechanism), a feature hashing module 410, and a feature hashing module 420. During incremental training, entity pairs $Q_D$, $T_D$ and ground truth classes for the entity pairs $Q_D$, $T_D$ from the IRF data set(s) are used as incremental training data. In some examples, for incremental training, the ML model 402 is initialized with the parameters learned during the last training (e.g., initial training, last incremental training). During incremental training, the ML model 420 processes the incremental training data to provide class predictions 420. A loss function is utilized to determine the accuracy of class predictions and iterations of incremental training can be executed, as described herein.

In accordance with implementations of the present disclosure, different data types of the incremental training are pre-processed before subsequent processing. Data types can include, without limitation, numerical, categorical, and string. In some examples, numerical data 422a, 424a of the entity $Q_D$ and the entity $T_D$, respectively, is processed by the feed forward network 404, which provides respective numerical embeddings (e.g., multi-dimensional vectors) that are representative of the respective numerical data 422a, 424a. The numerical embeddings are provided as input to the ML model 420. In some examples, categorical data 422b, 424b of the entity $Q_D$ and the entity $T_D$, respectively, is processed by the feature hashing module 410, which provides respective hash buckets, described in further detail herein. The hash buckets are processed by the categorical embedding module 406, which provides respective categorical embeddings (e.g., multi-dimensional vectors) that are representative of the respective categorical data 422b, 424b. The categorical embeddings are provided as input to the ML model 420. In some examples, string data 422c, 424c of the entity $Q_D$ and the entity $T_D$, respectively, is processed by the feature hashing module 412, which provides respective character-level hash buckets, described in further detail herein. The character-level hash buckets are processed by the character embedding module 408, which provides respective string embeddings (e.g., multi-dimensional vectors) that are representative of the respective string data 422b, 424b. The string embeddings are provided as input to the ML model 420.

In further detail, during incremental training of the ML model, implementations of the present disclosure utilize a loss function that focuses more on the wrong predictions made by the ML model during a previous inference run. This is achieved in the next incremental training phase by multiplying the weights (proportionately larger weights for higher confidence wrong predictions) with the cross-entropy loss for each of the misclassified instances. The weight is set to 1 for the rest of the training samples that were predicted correctly by the previous model and, as such, are treated as in conventional training. The overall effect of all of this is that the current active incremental training phase aggressively adjusts the weights to minimize the loss for the misclassified instances compared to correctly predicted instances. This leads to the ML model minimizing the wrong prediction in subsequent inference runs by focusing more on the new patterns in the data that it did not see in the previous training (for which a wrong prediction was made).

This is achieved by using a weight parameter on the data, which is a function of confidence or probability output by the ML model for each incorrect prediction. To keep metadata of the retrained ML model consistent with the previous ML model, feature hashing is used on any categorical inputs and/or string inputs. In this manner, the updated (retrained) ML model can handle new inputs not seen during the initial training as these will fall into one of the predetermined fixed numbers of hash buckets. In some examples, a number of negative samples used during incremental training is determined based on the same proportion used during the initial training which is based on a fixed target number of items. In this manner, a disproportionate number of negative samples (relative to the number of negative samples using in the original training data) is avoided during incremental training thereby reducing the training time further. In some examples, implementations of the present disclosure automatically determine the periodicity of the incremental training based on the size of the collected inference data and the feedback provided from the enterprise.

With regard to the loss function, during incremental retraining, implementations of the present disclosure determine a weight that is to be applied to the loss function. In some examples, the weight is determined based on the following example relationship:

$$w = \begin{cases} \dfrac{p_0}{1-p_0+\varepsilon}, & p_0 > 0.5 \\ 1, & p_0 < 0.5 \end{cases}$$

where w is the weight to be used for the sample (training instance), $p_0$ is a prediction probability of the entity pair $Q_D$, $T_D$ that was incorrectly predicted as belonging to the no match class (i.e., a false negative), and ε is a constant (e.g., a small value that is greater than 0) to prevent division by zero if $p_0$ is equal to 1. For entity pairs that are matches according to the IR data set (either 'single-match' or 'multi-match') and that are not classified as 'no match' by the ML model, the value of w is set equal to 1. As indicated from the above, by using the weights as described herein, the retraining of the ML model will focus more on the data that the ML model had misclassified. The higher the confidence, the higher the weight will be.

With regard to feature hashing, it can be used to quickly, and space-efficiently, vectorize features. That is, feature hashing can be used to convert arbitrary features into indices in a vector or matrix. In some examples, feature hashing applies a hash function to features (e.g., categorical data, string data) and uses the hash values as indices. A suitable hash function (e.g., Murmurlash3) is used to map a categorical feature to an integer, which is then reduced to a fixed number of hash buckets using a modulo function. The choice of the number of these hash buckets is a trade-off between quality and performance (space and run-time) and decided based on the number of categories (or distinct characters or tokens for text features) seen in the training set so that the hashing collisions (i.e. mapping of different tokens into the same hash bucket) are minimized while at the same time limiting the size of the feature space to avoid potential downstream performance issues in training and inference of the deep learning model which uses these features as input. A typical choice would be to choose the number of hash buckets equal to the square of the number of distinct categories (or the vocabulary size in the case of sequences of characters).

In the context of implementations of the present disclosure, and as noted above, inputs to the ML model can include categorical values, numerical values, and string values. To maintain consistency of the metadata across the incremental ML model trainings, feature hashing is used based on a fixed number of hash buckets. For example, if the incremental training sees new characters not seen by the ML model during the initial training (e.g., a payee name that was not included in the original training data), in the conventional approach, this will be considered as an out of vocabulary (OOV) character. This can lead to a decrease in the performance of the ML model. To avoid this scenario, during incremental training, implementations of the present disclosure hash the categorical inputs and the string inputs, as described above with reference to FIG. 4, to a fixed number of hash buckets. In this manner, any new characters seen during subsequent trainings (e.g., incremental training after initial training, subsequent incremental trainings) will still be treated as a valid input.

With regard to negative sampling, during the initial training of the ML model, a defined number of records (i.e., entity pair+ground truth class) are used to train the model. Based on the amount of available positive samples (i.e., samples that are accurate) the negative samples (i.e., samples that are inaccurate) are scaled to match this defined number of target records (e.g., 1 million records). In incremental training, the proportion of negative samples is determined to ensure that the number of negative samples used during incremental training is consistent with previous training(s). For example, if $N_t$ is the target number of samples in the training data with $N_p$ positive samples, the ratio of negative to positive samples would be represented as:

$$\frac{N_t - N_p}{N_p}$$

For subsequent incremental trainings, the same or approximately the same proportion is used based on the available number of positive samples. For example, one or more negative samples can be filtered (e.g., randomly) from the IRF data set to achieve the same or approximately the same proportion of negative-to-positive as used in the initial training. As another example, one or more positive samples can be filtered (e.g., randomly) from the IRF data set to achieve the same or approximately the same proportion of negative-to-positive as used in the initial training. In some examples, approximately the same indicates that the proportion used in incremental training is within a threshold percentage of the proportion used in the previous training (e.g., the initial training). Example threshold percentages can include, without limitation, 0.5%, 1%, 1.5%, 2%.

Figure 5:
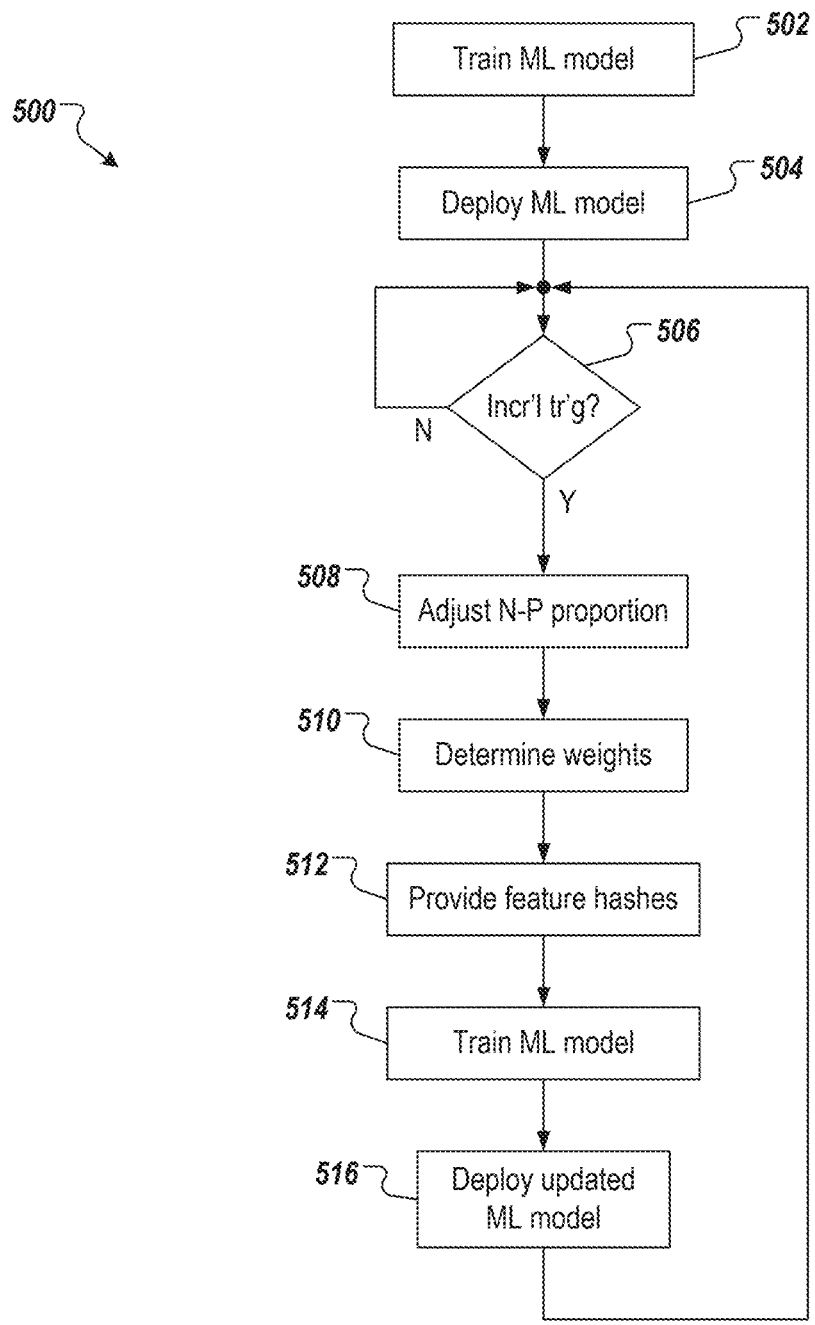
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A ML model is trained (502). For example, and as described herein, an application sends training data to a cloud service, the training data including historical entity pairs (i.e., query (Q) and target (T) pairs) and, for each entity pair, a ground truth that indicates which class the respective entity pair belongs to (e.g., single match, multi-match). A training job is triggered to provide initial training of the ML model. The ML model is trained by a model training module using the hashed features. For example, the model training module executes an iterative training process based on a loss function. After training, the ML model is stored in a ML models store and is made available for inference (e.g., production use).

The ML model is deployed (504). For example, and as described herein, the ML model is deployed to an inference runtime, which executes inferences in response to inference jobs. For example, the application (for which the ML model was trained), sends an inference request that includes inference data. In some examples, the inference data includes entity pairs that are to be classified by the MIL, model. Inference results are generated by the ML model, which include class predictions for each entity pair in the inference data.

It is determined whether incremental training is to be executed (506). For example, and as described herein, incremental training is initiated in response to receipt of inference results and feedback (IRF) from an enterprise system, incremental training is initiated in response to a predetermined period of time expiring since the last training (e.g., incremental training is performed at predetermined intervals), or incremental training is initiated after a threshold amount of IRF is received (e.g., X records being received). If it is determined that incremental training is not to be executed, the example process 500 loops back.

If it is determined that incremental training is to be executed, a proportion of negative records to positive records (N-P) is adjusted (508). For example, and as described herein, one or more negative samples can be filtered (e.g., randomly) from the IRF data set to achieve the same or approximately the same proportion of negative-to-positive as used in the initial training, or one or more positive samples can be filtered (e.g., randomly) from the IRF data set to achieve the same or approximately the same proportion of negative-to-positive as used in the initial training. Weights are determined (510). For example, and as described herein, a weight is determined for each record of the IRG data set (not filtered to adjust N-P proportion). In some examples, a weight is determined based on the following example relationship:

$$w = \begin{cases} \dfrac{p_0}{1 - p_0 + \varepsilon}, & p_0 > 0.5 \\ 1, & p_0 < 0.5 \end{cases}$$

where w is the weight to be used for the sample (training instance), $p_0$ is a prediction probability of the entity pair $Q_D$, $T_D$ that was incorrectly predicted as belonging to the no match class (i.e., a false negative), and $\varepsilon$ is a constant (e.g., a small value that is greater than 0) to prevent division by zero if $p_0$ is equal to 1. For entity pairs that are matches according to the IRF data set (either 'single-match' or 'multi-match') and that are not classified as 'no match' by the ML model, the value of w is set equal to 1. Feature hashes are provided (512). For example, and as described herein, feature hashing applies a hash function to features (e.g., categorical data, string data) and uses the hash values as indices during incremental training of the ML model.

The ML model is incrementally trained (514). For example, and as described herein, for incremental training, the ML model is initialized with the parameters learned during the last training (e.g., initial training, last incremental training). During incremental training, the ML model processes the incremental training data (IRF data sets) to provide class predictions. A loss function is utilized along with the weights determined for the individual records to determine the accuracy of class predictions and iterations of incremental training can be executed, as described herein. The updated ML model is deployed (516). For example, and as described herein, the updated ML model is deployed to the inference runtime, which executes inferences in response to inference jobs. The example process (500) loops back to determine whether incremental training is to be executed (506).

Implementations of the present disclosure achieve one or more of the following example advantages. Implementations of the present disclosure enable continuous updating of the ML model using a limited sub-set of training data, namely, production data with feedback (i.e., IRF data sets), as opposed to original training data. In this manner, incremental training of the ML model is time- and resource-efficient, as compared to training using larger training data (e.g., original training data+production data with feedback). The incremental training of the present disclosure mitigates performance degradation of the ML model over time to provide consistently accurate inference results in production systems. In some examples, the updated ML model provided through incremental training can perform the same or better, in terms of accuracy of inference results, than the ML model provided in previous training(s).

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for incremental training of a machine learning (ML) model, the method being executed by one or more processors and comprising:
receiving inference results with feedback (IRF) data sets, the IRF data sets comprising a set of records comprising inference results determined by the ML model during production use of the ML model and at least one correction to an inference result;
executing incremental training of the ML model to provide an updated ML model at least partially by:
selectively filtering one or more records of the set of records to adjust a negative sample to positive sample proportion of a sub-set of records based on a negative sample to positive sample proportion of training data during initial training of the ML model,
for each record in the sub-set of records, determining a weight, a first weight for a first record being set equal to 1 in response to determining that a first probability is less than a threshold probability, and
during incremental training, applying the weight of a respective record being in a loss function in determining an accuracy of the ML model based on the respective record; and
deploying the updated ML model for production use.

2. The method of claim 1, wherein the ML model is a classifier that classifies entity pairs to a class in a set of classes.

3. The method of claim 1, wherein a second weight for a second record is set to a value greater than 1 in response to determining that a second probability is greater than a threshold probability.

4. The method of claim 1, wherein a second weight of a second record is set equal to 1 in response to determining that the second record is designated to a specified class.

5. The method of claim 1, wherein executing incremental training of the ML model further comprises, for each record in the sub-set of records, generating hash values for data comprising one or more of a categorical type and a string type, the ML model being incrementally trained based on the hash values.

6. The method of claim 1, wherein incremental training is absent training data that was used to initially train the ML model.

7. A non-transitory computer-readable storage medium coupled to one or more processors and having instructions stored thereon which, when executed by the one or more processors, cause the one or more processors to perform operations for incremental training of a machine learning (ML) model, the operations comprising:
receiving inference results with feedback (IRF) data sets, the IRF data sets comprising a set of records comprising inference results determined by the ML model during production use of the ML model and at least one correction to an inference result;
executing incremental training of the ML model to provide an updated ML model at least partially by:
selectively filtering one or more records of the set of records to adjust a negative sample to positive sample proportion of a sub-set of records based on a negative sample to positive sample proportion of training data during initial training of the ML model,
for each record in the sub-set of records, determining a weight, and
during incremental training, applying the weight of a respective record being in a loss function in determining an accuracy of the ML model based on the respective record; and
deploying the updated ML model for production use.

8. The non-transitory computer-readable storage medium of claim 7, wherein the ML model is a classifier that classifies entity pairs to a class in a set of classes.

9. The non-transitory computer-readable storage medium of claim 7, wherein a second weight for a second record is set to a value greater than 1 in response to determining that a second probability is greater than a threshold probability.

10. The non-transitory computer-readable storage medium of claim 7, wherein a second weight of a second record is set equal to 1 in response to determining that the second record is designated to a specified class.

11. The non-transitory computer-readable storage medium of claim 7, wherein executing incremental training of the ML model further comprises, for each record in the sub-set of records, generating hash values for data comprising one or more of a categorical type and a string type, the ML model being incrementally trained based on the hash values.

12. The non-transitory computer-readable storage medium of claim 7, wherein incremental training is absent training data that was used to initially train the ML model.

13. A system, comprising:
a computing device; and
a computer-readable storage device coupled to the computing device and having instructions stored thereon which, when executed by the computing device, cause the computing device to perform operations for incremental training of a machine learning (ML) model, the operations comprising:
- receiving inference results with feedback (IRF) data sets, the IRF data sets comprising a set of records comprising inference results determined by the ML model during production use of the ML model and at least one correction to an inference result;
- executing incremental training of the ML model to provide an updated ML model at least partially by:
    - selectively filtering one or more records of the set of records to adjust a negative sample to positive sample proportion of a sub-set of records based on a negative sample to positive sample proportion of training data during initial training of the ML model,
    - for each record in the sub-set of records, determining a weight, and
    - during incremental training, applying the weight of a respective record being in a loss function in determining an accuracy of the ML model based on the respective record; and
- deploying the updated ML model for production use.

14. The system of claim 13, wherein the ML model is a classifier that classifies entity pairs to a class in a set of classes.

15. The system of claim 13, wherein a second weight for a second record is set to a value greater than 1 in response to determining that a second probability is greater than a threshold probability.

16. The system of claim 13, wherein a second weight of a second record is set equal to 1 in response to determining that the second record is designated to a specified class.

17. The system of claim 13, wherein executing incremental training of the ML model further comprises, for each record in the sub-set of records, generating hash values for data comprising one or more of a categorical type and a string type, the ML model being incrementally trained based on the hash values.

* * * * *